March 28, 1939. H. L. ROGERS 2,152,443
BRAKE APPLYING AND EQUALIZING MECHANISM
Filed Oct. 17, 1938 3 Sheets-Sheet 1

INVENTOR.
HUGH L. ROGERS
BY
HIS ATTORNEY.

March 28, 1939.  H. L. ROGERS  2,152,443
BRAKE APPLYING AND EQUALIZING MECHANISM
Filed Oct. 17, 1938  3 Sheets-Sheet 2
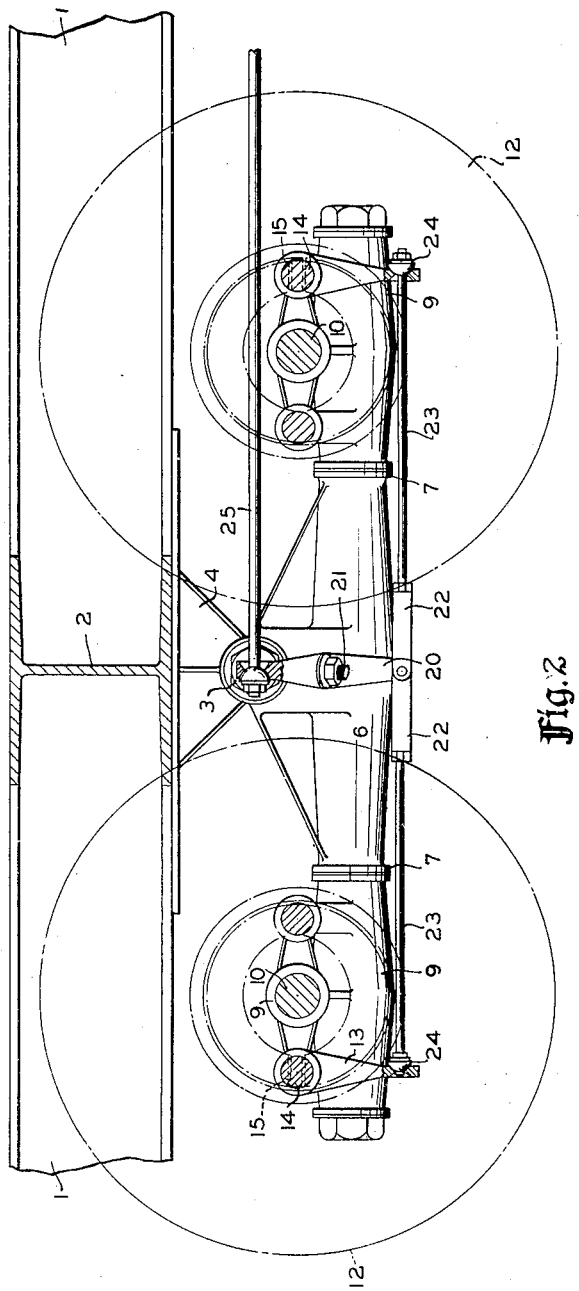
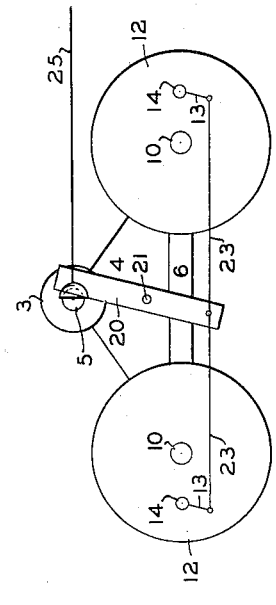
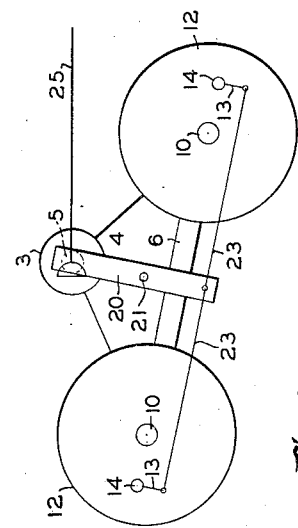
INVENTOR.
HUGH L. ROGERS
BY
HIS ATTORNEY.

Patented Mar. 28, 1939

2,152,443

UNITED STATES PATENT OFFICE 2,152,443

BRAKE APPLYING AND EQUALIZING MECHANISM

Hugh L. Rogers, Albion, Pa., assignor to The Rogers Brothers Corporation, Albion, Pa.

Application October 17, 1938, Serial No. 235,310

6 Claims. (Cl. 188—2)

This invention relates to a brake applying and equalizing mechanism for universal rocking wheel vehicles employing multiple rocking axes, such for example, as heavy duty trailers and the like, which have fore and aft sets of rear wheels, the sets being arranged to rock about a transverse axis, and the wheels of each set being arranged to rock about a longitudinal axis concurrently with the rocking of the sets of wheels about the transverse axis.

For the purpose of illustration, the invention will be described in connection with a heavy duty eight-wheel trailer, in which eight dual wheels are arranged in two transversely extending rows at the rear of the trailer, the forward row and the rearward row each including four dual wheels, and the rows being spaced from each other longitudinally of the trailer, as more fully described in my co-pending application, Serial No. 181,542, filed December 24, 1937, and entitled, "Brake applying and equalizing mechanism for universal rocking wheel vehicles".

It is necessary that each wheel be made to provide as much braking resistance as possible, and that the wheels be capable of providing equal amounts of resistance or braking pressure, because unequal braking pressure on the wheels usually causes skidding and swerving of the trailer, and also shifting of the load.

The principal object of the present invention is to provide a simple, economical and compact structure for effecting equalized braking pressure on all wheels of a multi-wheel, rocking axle vehicle.

As indicative of further objects, the specific arrangement shown in connection with a trailer having fore and aft rear wheels mounted on a rigid forwardly and rearwardly extending shaft which is arranged for rocking about a fixed transverse axis, comprises a brake applying or lever part arranged to rock about a pivot which is in fixed relation to the forwardly and rearwardly extending shaft, the lever having one of its ends arranged for connection to the brakes of the vehicle and the other of its ends arranged for connection to a source of power for applying the brakes, the latter end being positioned so that the point of connection to the source of power, while the brakes are in normal released position, is constrained at all times, to lie on the transverse rocking axis of the wheels.

Other objects and advantages will become apparent from the following description, wherein reference is made to the drawings, in which:

Fig. 2 is an enlarged sectional view taken on a plane indicated by the line 2—2 in Fig. 1, parts thereof being shown in elevation for clearness and illustration;

Fig. 3 is a diagrammatic view similar to Fig. 2, showing the operative relation among the parts of the mechanism when the wheels are rocked in a plane longitudinally of the vehicle, and with the brakes in normal or released position;

Fig. 4 is a similar diagrammatic illustration of the wheels, rocking framework, and brake mechanism when the latter is operated to apply the brakes.

Figure 1:
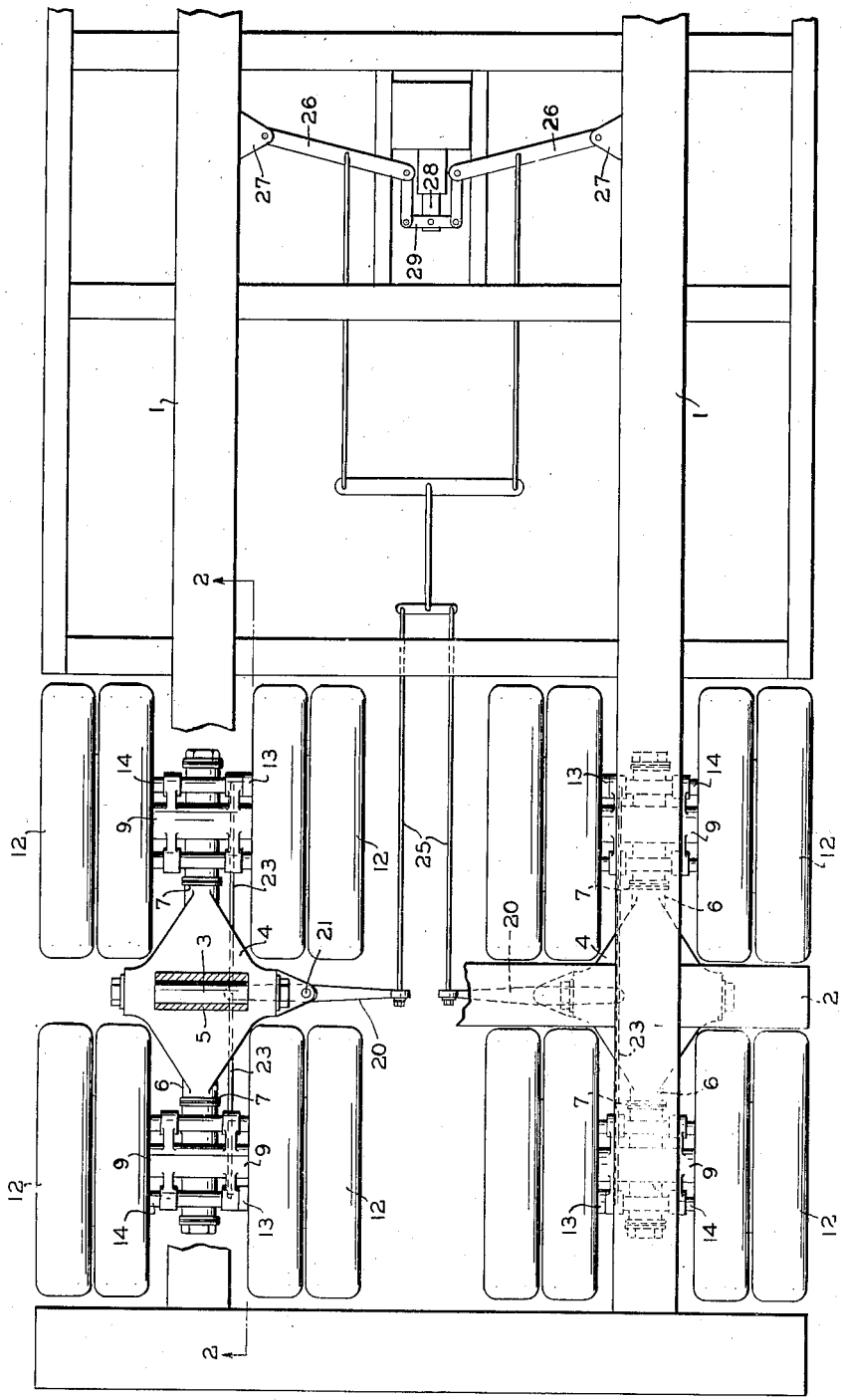
Fig. 1 is a horizontal plan view of an eight-wheel trailer with the present invention installed.
Figure 5:
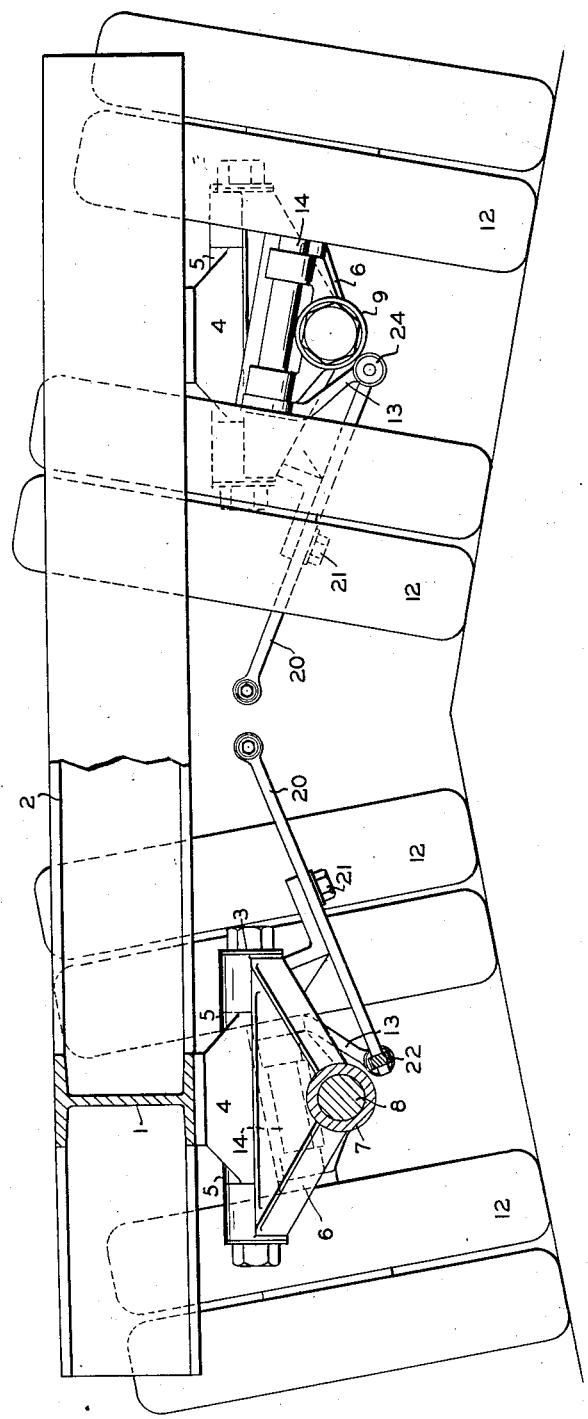
Fig. 5 is a rear elevation of the trailer partly broken away to show more clearly a brake applying lever of the present invention.

Referring to the drawings, the trailer shown for the purpose of illustration, comprises a frame having longitudinal sills 1 and a transverse frame member 2 at the rear portion of the frame. The trailer is provided with eight dual wheels which, through the medium of aligned transverse rock shafts 3, support the rear end of the trailer. The shaft 3 is positioned directly beneath the transverse frame member 2, as better illustrated in Figs. 2 and 3. Bracket bearings 4 are secured to the under side of the transverse frame member 2 and to longitudinal sills 1, and are provided with bearing sleeves 5 in which the transverse shafts 3 are received.

On each transverse shaft 3 is mounted a rigid housing or rigid wheel frame, indicated generally at 6, which has bearing portions arranged to embrace the shaft 3 at opposite sides of the bearing sleeve 5. The housing 6 also has a depending forwardly and rearwardly extending sleeve 7 which is positioned below the axis of the rock shaft 3 and accommodates a longitudinal rock shaft 8. Mounted on each end of the rock shaft 8 are longitudinal bearing sleeves 9 which carry transverse wheel axles 10, each axle 10 extending transversely of the associated sleeve 9 and therebeyond laterally. Wheels 12 are mounted on the ends of axles 10, each two wheels and associated axle providing a set of wheels which are adapted to rock about the longitudinal shaft 8. Such a set of wheels is provided at each end of the shaft 8 so that, while the wheels of each set may rock about a longitudinal shaft, the forward and rearward set of wheels may rock concurrently about the associated transverse shaft 3.

Each wheel has a suitable brake, and both brakes of the same set of wheels are operated by a single associated brake operating lever 13. In the form illustrated, brake lever 13 is preferably rigid with a suitable rock shaft 14 which is mounted in the sleeve 9 of the associated set of wheels. On each end of the shaft 14 are suitable spreaders 15 for expanding the brakes when the lever 13 is swung to predetermined positions. Any suitable return means not shown is provided for returning the brake shoes to releasing position. It is apparent that if the vehicle travels over an uneven road surface, the wheels may rock about the longitudinal shaft 8 to accommodate themselves in unevenness in the surface in a direction transverse to the vehicle. Further, the sets of wheels may rock concurrently about the axis of the shaft 3 to compensate for irregularities in unevenness in the road surface in a direction longitudinally of the vehicle. Since the sleeve 7 and the shaft 8 are rigid, any movement of the rear set of wheels is reflected in the forward set of wheels, or by lifting the body of the trailer, but under all conditions, the axis of the transverse shaft 3 remains fixed with respect to the trailer body.

In order to apply equal braking pressure to the two sets of wheels on the common shaft 8, the brake applying lever 20 of the present invention is provided. The lever 20 preferably is formed of a rigid piece of strap metal which is pivotally mounted between its ends on a pivot 21. The pivot 21 is fixedly secured to the housing 6, and extends generally transversely of the vehicle. In the form illustrated, the pivot 21 extends downwardly toward the mid-portion of the vehicle and the lever extends obliquely to the axis of the shaft 3. The lower end of the lever 20 is connected by suitable clevis connections 22 to brake operating rods 23, the clevis connections 22 being arranged to permit the rods 23 to swing in the plane of the lever 20. The opposite ends of the rods 23 are connected to the brake levers 13 of the associated sets of wheels, these latter connections preferably being by means of a semi-ball and socket joints, as indicated at 24, and as more fully described in my co-pending application. The clevis connections 22 in combination with the ball and socket connections 24, compensate for both the lateral and vertical components of the path of the lower end of the levers 20 due to rocking of the associated sets of wheels about the longitudinal shaft 8. The brake operating levers 13 are preferably disposed as closely as is practical to a position directly beneath the axis of the shaft 8, so that only a slight amount of vertical movement results from the rocking of the associated wheels about the shaft 8. The brakes are so arranged that upon movement of the lower end of lever 20 in one direction, the brakes of both sets of wheels are applied, and upon the brakes of both sets of wheels being released, the lower end of the lever 20 may move in the opposite direction. The upper end of the lever 20 is arranged for connection to a suitable means or source for applying power to the lever, for example, to a suitable brake operating rod or cable 25.

The point of connection between the rod or cable 25 and the upper end of the lever or part 20 is preferably exactly at the axis, if projected, of the transverse rock shaft 3 when the brakes are in released condition, and in all events, is as near to said axis as it can be made practically. As a result of this positioning of the connection between the upper end of the lever 20 and the rod 25 in combination with the rigid longitudinal shaft 8, the point of connection remains at the projected axis of the shaft 3 regardless of the position to which the housing 6 has been rocked about the shaft 3. Consequently, assuming that the cable or rod 25 is tight, but has not been operated to apply the brakes, it is apparent that the housing may rock about the shaft 3 without changing the position of the cable or rod 25 in any way, or rocking the lever 20 about its pivot. As a result, a given movement of the rod or cable 25 by the operator of the vehicle will result in exactly the same application of braking pressure to both sets of wheels of the associated shaft 3 regardless of their rocked position about the shaft 3, or their rocked position about the shaft 8. Thus, equal braking pressure is applied to all four wheels of one housing 6, and corresponding equal braking pressure can be applied to the four wheels of the other housing 6. Next, it is necessary to provide equalization between the group of wheels carried by one housing of rigid wheel frame 6 and the group of wheels carried by the other housing 6. For this purpose, the rod or cable 25 leading to one group of wheels is connected to a link 26, one end of which link is preferably connected to a bracket 27 on the longitudinal sills of the frame. The other end of the link 26 is connected, through a suitable equalizing rocking beam 29 to the end of a piston 28 of a pressure or vacuum operated piston and cylinder assembly. The rod 25 of the other group of wheels is connected correspondingly, so that equalization of the power supplied by the piston, with respect to the rods 25, is effected through the medium of the rocking beam 29. As a result, equalized braking pressure is applied to all of the eight wheels of the vehicle regardless of the position to which any two wheels are rocked about their longitudinally rocking axis, and regardless of the positions of which the wheels are rocked about their transverse axis.

Having thus described my invention, I claim:

1. The combination with a vehicle having forward and rearward brake-equipped wheels which are constrained for rocking about a fixed axis extending transversely of the direction of movement of the vehicle and at least two of which, concurrently with such rocking, are rockable about an axis extending in said direction, means arranged for operating brakes on the forward and rearward wheels, said means including a brake operating part which is constrained to rock about said transverse axis when the wheels rock about said axis, said part having a portion normally extending into alignment with the transverse axis, and brake applying means pivotally connected to said part approximately on said transverse axis.

2. The combination with a vehicle having forward and rearward brake-equipped wheels which are constrained by a rigid frame mounting for rocking about a fixed axis extending transversely of the direction of movement of the vehicle and at least two of which, concurrently with such rocking, are rockable on said frame about an axis extending in said direction of movement of the vehicle, means arranged for operating brakes on the forward and rearward wheels, said means including a member, a portion of which is normally intercepted by said transverse axis irrespective of the manner of rocking of the wheels, and brake applying means connected to said member approximately on said transverse axis.

3. The combination with a vehicle having forward and rearward brake-equipped wheels which are constrained for rocking about a fixed axis extending transversely of the direction of movement of the vehicle and at least two of which, concurrently with such rocking, are rockable about axes extending in said direction of movement, means operatively interconnecting the brakes of the forward and rearward wheels, which means are displaced longitudinally of the vehicle when the wheels rock about said fixed axis, an applying lever pivotally connected to said means, the lever being constrained to rock bodily about said transverse axis when the wheels rock about said axis and having a portion extending laterally of the vehicle into the region of the transverse axis, and brake applying means connected to the lever in said region.

4. A brake applying mechanism for multi-wheeled vehicles in which a plurality of wheels, each equipped with brakes, are spaced and supported for rocking movement by a frame which pivots about an axis extending transverse to the direction of movement of the vehicle, said mechanism comprising operating means connecting the brakes of the wheels in fore and aft directions and movable bodily with the frame and disposed in horizontally offset relationship to the transverse rocking axis, a brake applying means for said operating means, the applying means including a part which extends to said transverse rocking axis, and a lever pivoted to said frame and operatively connected with the operating means and with said part of the applying means, the connection with the latter being in the region of the transverse rocking axis of the frame.

5. A brake applying mechanism for multi-wheel vehicles in which a plurality of multi-wheel units each comprising two pairs of transversely rockable wheels, each equipped with brakes, which pairs are spaced and supported for longitudinal rocking movement on a frame which pivots about an axis extending transverse to the direction of movement of the vehicle and which axis is situated longitudinally of the vehicle between the pairs, said mechanism comprising operating members respectively connecting all the brakes of the wheels of each unit and rockable about the transverse axis therewith, the operating members of each unit including a part which extends in angular relationship to said transverse rocking axis and normally into alignment therewith, and a central brake applying mechanism on the vehicle remote from the wheels, said mechanism including equalizing means and applying members extending therefrom to said parts of the two units and respectively connected therewith approximately on said transverse axis.

6. In a multi-wheel vehicle of the type having longitudinally extending transversely pivoted frame members on which brake-equipped wheels are pivoted in pairs for rocking movement concurrently with rocking movement of the frames, and wherein the brakes are connected for concurrent operation by interconnecting members extending fore and aft of each frame member below the transverse pivot axis thereof, brake applying levers pivoted to the frames and pivotally connected to respective brake interconnecting members, the levers extending toward each other obliquely upwardly from their points of connection with the brake interconnecting members into the region of said transverse pivot axis, and control means extending from a region remote from the wheels and connected to said levers approximately on said axis.

HUGH L. ROGERS.